United States Patent [19]

Stephenson et al.

[11] 4,218,919
[45] Aug. 26, 1980

[54] APPARATUS FOR MEASURING ELEVATION

[76] Inventors: Donald K. Stephenson, N76 W22166 Cherry Hill Rd., Sussex, Wis. 53089; Douglas J. Stephenson, 3525 Paradise La., Brookfield, Wis. 53005

[21] Appl. No.: 940,750

[22] Filed: Sep. 8, 1978

[51] Int. Cl.² .............................................. G01C 5/00
[52] U.S. Cl. .................................. 73/432 HA; 33/367
[58] Field of Search ................. 73/432 HA, 300, 301; 33/377, 367

[56] References Cited

U.S. PATENT DOCUMENTS

| | | | |
|---|---|---|---|
| 1,289,755 | 12/1918 | Haynes | 73/300 |
| 2,557,021 | 6/1951 | Williams | 73/432 HA |
| 2,672,758 | 3/1954 | Hibbard | 73/432 HA |
| 2,709,920 | 6/1955 | Moore | 73/432 HA |
| 3,640,134 | 2/1972 | Hop | 73/301 |

*Primary Examiner*—Gerald Goldberg
*Assistant Examiner*—Denis E. Corr
*Attorney, Agent, or Firm*—Michael, Best & Friedrich

[57] ABSTRACT

Disclosed herein is apparatus for measuring elevation and including an elongated conduit adapted to be filled with liquid and having opposite ends, and a first pressure sensing transducer connected to one end of the conduit for measuring the fluid pressure in that end and including means for producing a first pressure indicative signal. The elevation measuring apparatus further includes a second pressure sensing transducer in fluid communication with the other end of the conduit for measuring the pressure of fluid at that end and including means for producing a second pressure indicative signal, and means for processing the output signals of the pressure sensing transducers, to produce an elevation differential readout.

16 Claims, 5 Drawing Figures

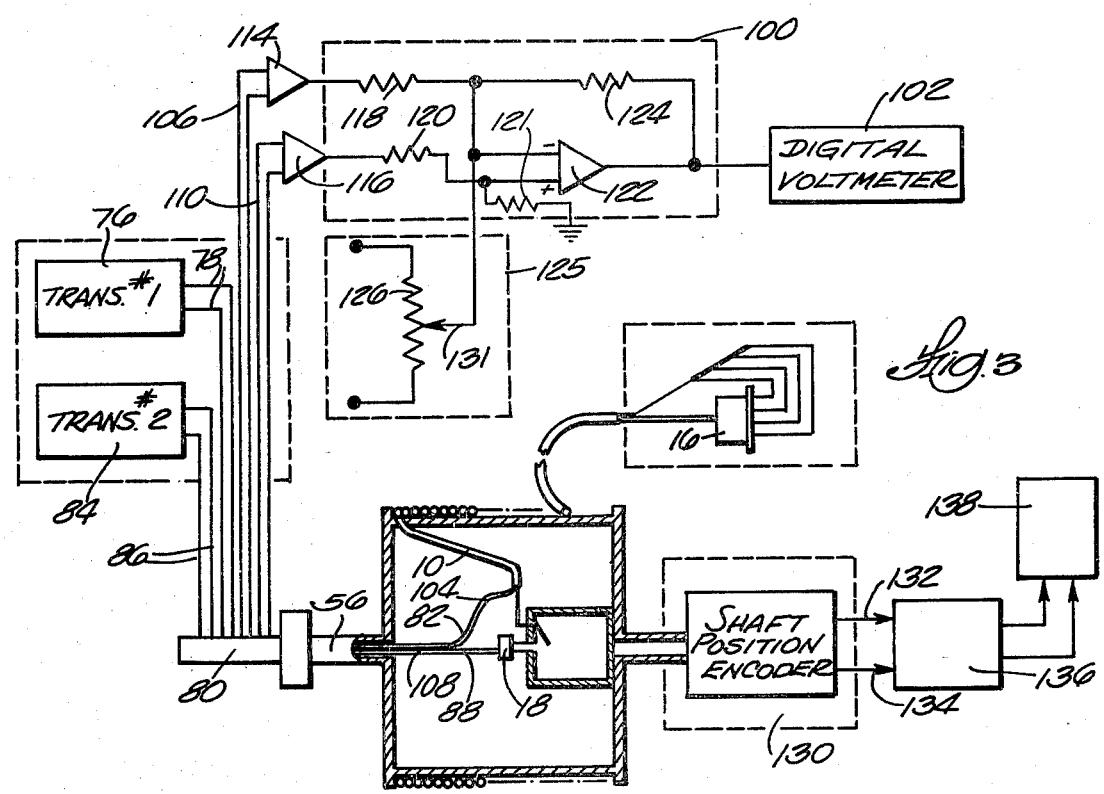
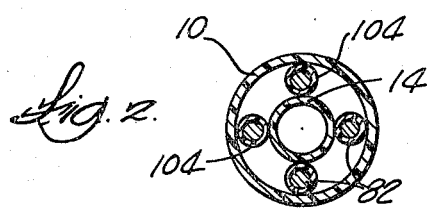
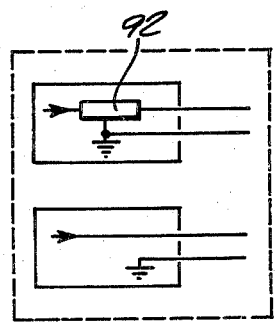
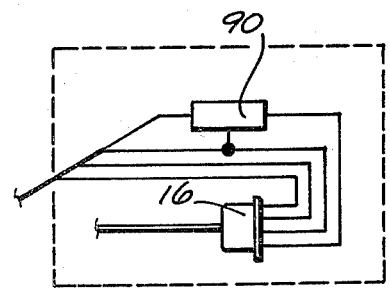

APPARATUS FOR MEASURING ELEVATION

BACKGROUND OF THE INVENTION

1. Field of the Invention

The invention relates to apparatus for use in measuring the slope of pipelines and more particularly to apparatus employing a fluid filled conduit having pressure sensing transducers attached to its opposite ends. One end of the fluid filled conduit, having a pressure sensing transducer attached thereto, is adapted to be pulled through the pipeline. Means are also provided to compare the output signals of the pressure sensing transducers to yield an elevation differential output.

2. Description of the Prior Art

Attention is directed to the Moore U.S. Pat. No. 2,709,920, issued June 7, 1955 and illustrating apparatus for determination of the elevation of a pipeline and including a flexible fluid conduit which is to be pulled through a pipeline and including a relief valve attached to that end of the conduit intended to be pulled through the pipeline. A pressure gauge is attached to the opposite end of the conduit. In operation, as the pressure relief valve is pulled through the pipeline, fluid in the conduit is exhausted through the relief valve and the pressure in that end of the conduit remains approximately constant. Determination of the difference between the pressure indicated by the pressure gauge and the known pressure at the pressure relief valve will yield the height difference between the pressure gauge and the end of the conduit conveyed through the pipeline. The structure shown in the Moore patent has the disadvantage that fluid must be continuously supplied to the fluid filled conduit and the mechanical pressure relief valve is not sufficiently sensitive to accurately indicate the slope of a pipeline.

Attention is also directed to the Gearhart U.S. Pat. No. ,3,815,424, issued June 11, 1974; the Rosa et al. U.S. Pat. No. 3,835,707, issued Sept. 17, 1974; the Bowditch et al. U.S. Pat. No. 4,026,156, issued May 31, 1977; and the Meents et al. U.S. Pat. No. 2,851,799, issued Sept. 16, 1958. Attention is also directed to the Nilsson U.S. Pat. No. 3,779,084, issued Dec. 18, 1973; and the Harland U.S. Pat. No. 3,724,278, issued Apr. 3, 1973.

SUMMARY OF THE INVENTION

The invention includes apparatus for determining elevation including an elongated conduit adapted to be filled with liquid and having opposite ends, and a first pressure sensing transducer connected to one end of the conduit for measuring the fluid pressure in that end and including means for producing a first pressure indicative signal. The apparatus further includes a second pressure sensing transducer connected to the other end of the conduit for measuring the pressure of fluid in the conduit at the other end and including means for producing a second pressure indicative signal, and means for processing the output signals of the pressure sensing transducers to produce an elevation differential readout.

One of the principal features of the invention is the provision in the apparatus for measuring elevation, of a rotatable spool, the conduit being wound on the spool and being removable from the spool by rotating the spool, and means for measuring the length of the conduit removed from the spool.

Another of the principal features of the invention is the provision in the apparatus for measuring elevation, of a first elongated tube housing the elongated conduit and a plurality of electrical wires each being connected to one of the pressure sensing transducers.

Another of the principal features of the invention is the provision in the means for processing the output signals of the pressure sensing transducers of a subtraction circuit and means for quanticizing the output differential between the two pressure transducers to produce an elevation readout.

Other features and advantages of the invention will become known by reference to the following description, to the appended claims, and to the drawings.

BRIEF DESCRIPTION OF THE DRAWINGS

FIG. 2 is an enlarged cross section elevation view of a portion of the tubing of the elevation measuring apparatus shown in FIG. 1.

FIG. 3 is a schematic view of the elevation measuring apparatus shown in FIG. 1 and illustrating the circuitry of that apparatus.

FIG. 4 is a schematic view of an alternative power source for the pressure transducers of the invention.

FIG. 5 is a schematic view of an alternative movable pressure sensitive transducer.

Figure 1:
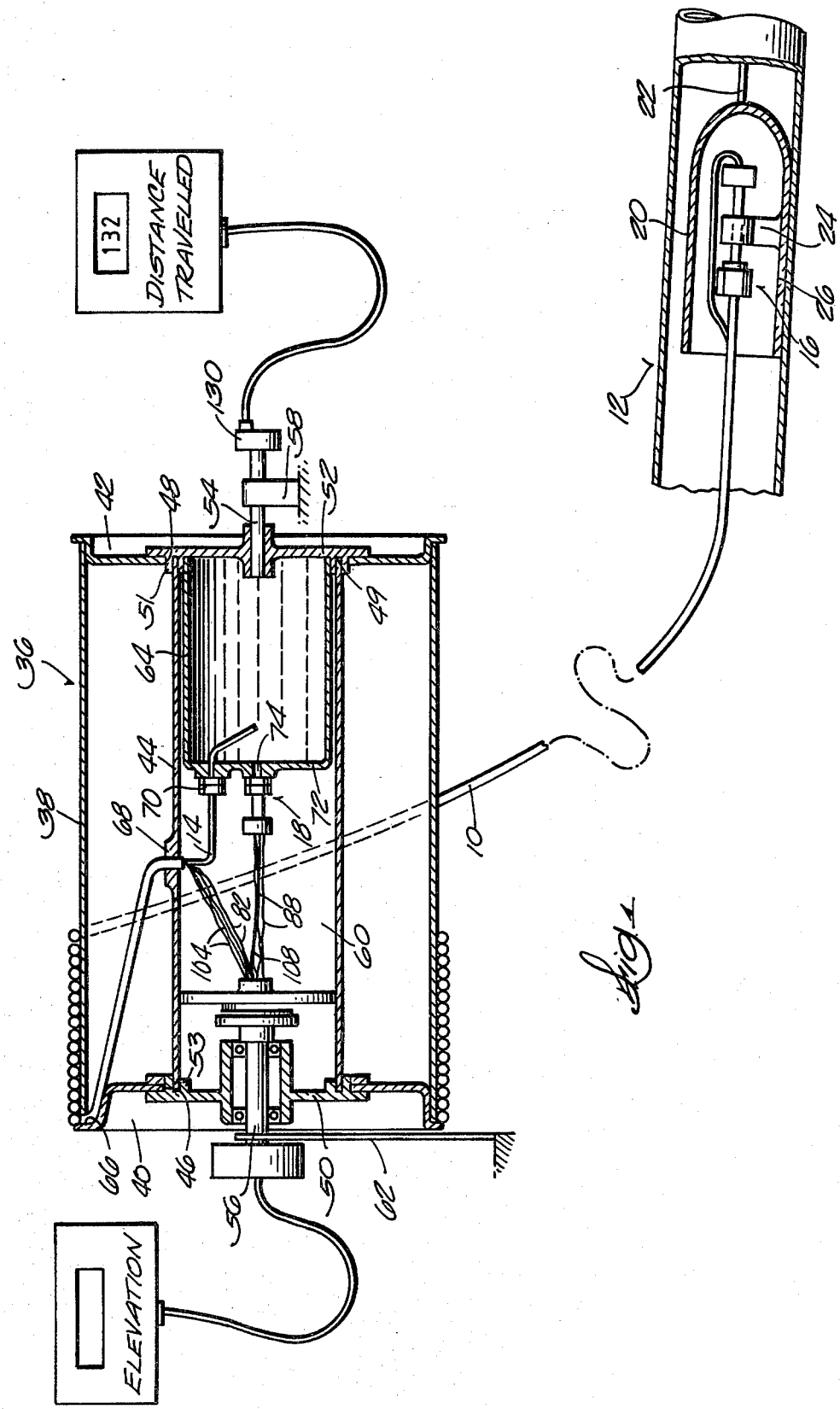
FIG. 1 is an elevation view illustrating the elevation measuring apparatus of the invention with portions broken away and with the components of the apparatus shown in a typical position for measuring the elevation of a portion of a pipeline.

Before describing at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Ilustrated in FIG. 1 is an elevation measuring apparatus which can be employed for purposes of example but not by way of limitation, in measuring the slope of pipelines such as sewer lines and for determining the relative height of each incremental portion of the sewer line along its entire length. The elevation measuring apparatus of the invention can accordingly provide a means for accurately detecting improper slopes in portions of sewer lines and other pipelines to thereby facilitate correction of the slope of that portion of the sewer line.

The elevation measuring apparatus of the invention generally includes a tubing 10 which can be pulled through the sewer line 12 or other pipeline and which includes a fluid filled conduit 14 (FIG. 2) enclosed therein. A movable pressure sensing transducer 16 is attached to one end of the tubing 10 in fluid communication with the fluid filled conduit, and the pressure sensing transducer 16 and the tubing 10 are intended to be pulled through the sewer line. A second pressure sensing transducer 18, functional as a reference, is attached to the opposite end of the fluid filled conduit 14. The vertical distance between the movable pressure sensing transducer 16 and the reference pressure sensing transducer 18 is directly proportional to the pressure differential in the opposite ends of the fluid filled conduit 14. Accordingly, by measuring the pressure in the opposite ends of the fluid filled conduit 14, the vertical height difference between the opposite ends of the conduit 14 can be measured. By further measuring the amount of tubing which is fed into the pipeline 12 it is possible to accurately determine the vertical position of each portion of the pipeline as the pressure sensing transducer 16 is pulled through the pipeline.

More specifically, the illustrated construction of the invention includes a hollow metal protective cylinder 20 attached to one end of the tubing 10 and surrounding the pressure sensing transducer 16 and being adapted to rest on the bottom of the pipe 12. A towing line 22 is attached to the leading end of the cylinder 20 and is provided to pull the cylinder 20 through the pipeline. The cylinder 20 is of sufficient weight that, as it is pulled through the pipeline 12, it will engage the bottom of the pipe. The pressure sensing transducer 16 is supported in the hollow metal cylinder 20 by a support member 24 which is integrally connected to the wall 26 of the hollow metal cylinder and extends radially inwardly thereform.

While various arrangements can be provided, in the embodiment illustrated in FIG. 2, the tube 10 is comprised of an outer protective flexible tubing surrounding the fluid filled conduit 14. Four electrical wires connected to the pressure sensing transducer 16 are also housed within the outer protective tubing between the fluid filled conduit 14 and the outer tubing.

Means are also provided for supporting an extended length of the tubing 10 in a manner such that the tubing can be conveniently fed into the sewer pipe 12. While various arrangements can be provided, in the illustrated construction, the tubing 10 is supported in wound relation on a large cylindrical spool or reel 36 in a single helical layer. The spool 36 includes a large outer cylinder 38 having an outer surface for supporting the tubing 10, the cylinder 38 being closed at its opposite ends by circular end plates 40 and 42. In a preferred embodiment of the invention, the cylinder 38 is of a sufficient diameter that at least 250 feet of tubing can be wound in a single layer thereon. The spool 36 also includes a smaller diameter inner cylinder 44 having opposite ends supported in concentric relation within outer cylinder 38.

The spool 36 is supported for rotation about its longitudinal axis by a pair of hubs 50 and 52 and by a pair of supporting shafts 54 and 56, respectively. The hub 52 includes an annular ring 51 extending inwardly with respect to end plate 42, the annular ring 51 being received in a circular hole 48 in the end plate 42 and the annular ring 51 including an annular slot 49 therein for receiving the end of the inner cylinder 44. The hub 50 similarly includes an annular ring 53 extending inwardly with respect to end plate 40, the annular ring 53 being received in a circular hole 46 in the end plate 40, and the annular ring 53 including an annular slot 49 therein for receiving the end of the inner cylinder 44. The supporting shaft 54 extends axially outwardly from the hub 52 and is fixed to the hub 52 for rotation with the spool 36. The shaft 54 is rotatably supported by a support bracket 58. The other support shaft 56 comprises a hollow tube extending through the hub 50, having one end in communication with the central chamber 60 of the inner cylinder 44, and having another end extending axially outwardly from the hub 50 and supported by a support bracket 62. Though the spool 36 is shown in FIG. 1 as being rotatable about a horizontal axis, it could similarly be rotatable about a vertical axis.

The spool 36 also houses a cylindrical fluid reservoir 64 disposed within the inner cylinder 44 and adjacent one of its ends such that one of the end walls of the cylindrical fluid resservoir 64 is formed by the hub 52. The tubing 10 extends through a bore 66 in one end of the outer cylinder 38 and is journalled by means of a tubing connection 68 to the inner cylinder 44. The fluid filled conduit 14 further extends through a fluid coupling 70 into the fluid reservoir 64.

The reference pressure sensing transducer 18 is connected to the fluid reservoir 64 and is in fluid communication with the fluid in the reservoir 64 such that it measures the pressure of the fluid in the reservoir adjacent the axis of rotation of the spool 36. While the pressure sensing transducer 18 can be supported in various ways, in the illustrated construction, the pressure sensing transducer 18 is positioned within the spool 36 in axial alignment with the axis of rotation of the spool 36 and is rigidly attached to the end wall 72 of the reservoir 64. Fluid communication between the reservoir 64 and the pressure sensing transducer 18 is provided by a fluid conduit 74 extending through the end wall 72.

As previously stated, the pressure sensing transducers 16 and 18 are intended to sense the pressure in the opposite ends of the fluid filled conduit 14. In one preferred embodiment of the invention, the pressure sensing transducers may comprise Model 1710 pressure transducers manufactured by Foxboro/I.C.T., Inc., San Jose, Calif. While various arrangements can be provided, in the illustrated construction, the remote pressure sensing transducer 16 is energized by a constant current source 76 (FIG. 3) connected through leads 78 and a slip ring assembly 80 supported on the outwardly extending end of the supporting tube 56 and by leads 82 extending through the tube 56 and through the tubing 10 to the pressure sensing transducer 16. The slip ring assembly can conveniently comprise a Model 58 slip ring assembly produced by Michigan Scientific Corporation of Milford, Mich. The reference pressure sensing transducer 18 is similarly energized by a second current source 84 connected through leads 86, the slip ring assembly 80, and through leads 88 to the pressure sensing transducer 18. While various means can be used to provide a constant current source, in one embodiment of the invention each of the constant current sources 76 and 84 can comprise Model 930 power supplies produced by Calex Manufacturing Company of Pleasant Hill, Calif. By providing a constant current source means for energizing the pressure sensing transducer, the differences in the resistance caused by the variance in the temperature of the lead wires and in the lengths of wires connecting the pressure sensing transducers 16 and 18 to the current source can be reduced and the accuracy of the pressure sensing transducers increased. Resistance changes in the wires might otherwise have an appreciable effect on the output of the pressure sensing transducers. As an alternative to the use of a constant current source as a means of energizing the remote pressure sensing transducer 16, the pressure sensing transducer could be provided with a voltage regulator 90 as illustrated in FIG. 5 and the current source can be replaced with a voltage source 92 as illustrated in FIG. 4. A similar arrangement could also be provided for energizing the pressure sensing transducer 18.

Means are also provided for comparing the pressures measured at the opposite ends of the fluid filled tube 14 by the pressure sensing transducers 16 and 18 and for converting that result to a digital readout of the height difference between the pressure sensing transducers 16 and 18. While various arrangements can be provided, in the illustrated construction, the comparing means includes a conventional subtraction circuit 100 which is coupled to the input of a DC input digital voltmeter 102 in turn calibrated to indicate the vertical height difference between the pressure sensing transducers 16 and 18. More particularly, the pressure sensing transducer 16 is connected through leads 104, through the slip ring assembly 80, and through leads 106 to the subtraction circuit 100. Similarly, the transducer 18 is connected by leads 108, the slip ring assembly 80, and leads 110 to the subtraction circuit 100. Means are further provided for reducing the sensitivity of the subtraction circuit 100 to the variation in the resistance in the lead wires occasional by the difference in length. While various arrangements can be provided, in the illustrated construction, the leads 106 are connected through an instrumentation amplifier 114 to the subtraction circuit 100, the instrumentation amplifier 114 being intended to amplify the output of the transducer 16 and to isolate the resistance changes in the leads by virtue of the extremely high input impedance of the instrumentation amplifier. The leads 110 are similarly connected through an instrumentation amplifier 116 to the subtraction circuit 100. Each of the instrumentation amplifiers 114 and 116 may conveniently comprise a model 3629 CM amplifier manufactured by Burr-Brown Research Corporation of Tucson, Ariz.

The output of the instrumentation amplifier 114 is connected through resistor 118 to the negative terminal of an operational amplifier 122. The output of the instrumentation amplifier 116 is connected through a resistor 120 to the positive terminal of the operational amplifier 122. The positive terminal of the operational amplifier 122 is also connected through a resistor 121 to a ground. In the illustrated construction the operational amplifier 122 may comprise a model AD308H operational amplifier produced by Analog Devices, Incorporated of Norwood, Mass. In this arrangement, the magnitude of the signal produced by one of the pressure sensing transducers 16 and 18 and conveyed through one of the instrumentation anplifiers 114 and 116 is subtracted from the output signal produced by the other pressure sensing transducer and conveyed through the other instrumentation amplifier. The operational amplifier 122 of the subtraction circuit 100 is suitably connected to the digital voltmeter 102 which is calibrated to provide a readout proportional to the vertical height difference between the pressure transducers 116 and 118. In a preferred embodiment the DC digital voltmeter 102 may comprise a Model AD2027 DC input digital voltmeter manufactured by Analog Devices, Incorporated, Norwood, Mass.

Means are also provided for calibrating the output of the operational amplifier 122 of the subtraction circuit such that the ouput of the DC digital voltmeter 102 will accurately indicate the vertical height difference between the pressure transducers 16 and 18. Such calibrating means can include an adjustable resistor 124 suitably connected between the negative terminal input of the operational amplifier 122 and its output. In operation, calibration of the voltmeter 102 can be accomplished by positioning the pressure sensing transducer 18 and adjusting the resistor 124 such that the digital voltmeter 102 indicates the pre-established height difference between pressure sensing transducers 16 and 18.

Means are also provided for balancing the outputs of the high impedence instrumentation amplifiers 114 and 116 such that the digital voltmeter 102 yields a zero output when the pressure transducers are horizontally aligned. The zero adjust balancing means 125 (FIG. 3) includes a positive DC voltage source (not shown) and a negative DC voltage source (not shown) connected by a resistor 126. The zero adjust balancing means 125 also includes means indicated as element 131, for adjustably connecting the output of the high impedance amplifier 114 to the resistor 126.

Means are also provided for indicating the length of tubing 10 which has been fed into the pipe 12 to thereby permit measurement of the position of the pressure sensing transducer 16 in the pipe 12 as it moves through the pipe 12. By providing means for indicating the position of transducer 16 in the pipe, the elevation and slope of each incremental portion of the pipe can be determined. While various arrangements can be provided, in the construction illustrated in FIG. 3 an incremental shaft position encoder device 130 is attached to the outwardly extending end of the shaft 54. The shaft position encoder 130 may comprise a Vernitech optical type incremental shaft position encoder device Model OADC-1l/64P/INC with up-down separator option, manufactured by Vernitech Division of Vernitron Corporation, Deer Park, N.Y. The incremental shaft position encoder is suitably connected through a count-up line 132 and a count-down line 134 to up-down counter logic 136 which may be suitably comprised of a No. CD40192B Up-Down Counter Logic devices manufactured by RCA Corporation, Summerville, N.J. The up-down counter device 136 is similarly suitably connected to a digital output eans 138 including a plurality of digital display devices Model 739-0462-601 manufactured by Dialight Company of Brooklyn, N.Y.

In operation of the elevation measuring apparatus descibed above, as the tubing 10 is fed through the pipeline 12, rotation of the spool or reel 36 and consequent rotation of the shaft 54 will cause the shaft encoder 130 to send signal pulses to the up-down counter logic device 136. The up-down counter logic device 136 will in turn cause a digital output of digital output means 138. Rotation of the shaft 54 in the opposite direction will cause the up-down counter logic 136 to cause the digital output means 138 to have a decreasing numerical display.

Various of the features of the invention are set forth in the following claims.

We claim:

1. Apparatus for measuring the slope of a pipeline, said apparatus comprising an elongated conduit adapted to be filled with liquid and having opposite ends, a first pressure sensing transducer connected to one of said ends of said conduit for measuring the fluid pressure in said one of said ends and including means for producing a first pressure indicative electrical signal, a second pressure sensing transducer connected to the other of said ends of said conduit for measuring the pressure of fluid in said conduit at said other end and including means for producing a second pressure indicative electrical signal, means for pulling said second pressure sensing transducer and said other of said ends of said conduit through said pipeline, and means for processing said electrical signals of said pressure sensing transducers to determine incremental changes in elevation of said pipeline as said second pressure sensing transducer is pulled through said pipeline.

2. The apparatus set forth in claim 1 and further including a rotatable spool, said conduit being wound on said spool and being removable from said spool by rotating said spool, and means for measuring the length of said conduit removed from said spool.

3. The apparatus set forth in claim 2 wherein said measuring means includes means for measuring the angular movement of said spool during rotation of said spool.

4. The apparatus set forth in claim 2 and wherein said rotatable spool is rotatable about a horizontal axis and wherein one of said pressure sensing transducers is supported within said spool adjacent said axis.

5. The apparatus set forth in claim 1 and further including a first elongated tube, said elongated conduit being housed in said elongated tube, and a plurality of electrical wires housed in said elongated tube, said wires each being joined at one end to one of said pressure sensing transducers.

6. The apparatus set forth in claim 1 wherein said means for processing said signals includes means for subtracting the output signal of one of said pressure sensing transducers from the output signal of the other of said pressure sensing transducers.

7. The apparatus set forth in claim 1 wherein said means for processing said signals includes a subtraction circuit and means for quanticizing the output of said subtraction circuit and for producing a numerical readout connected to said subtraction circuit.

8. A method for determination of the incremental changes in elevation of a pipeline including the steps of:
pulling one electronic pressure sensing transducer of a pair of pressure sensing transducers joined by a liquid filled conduit through the pipe,
measuring the electrical output differential between the two pressure transducers, and
quanticizing the electrical output differential between the two pressure transducers to produce an elevation readout to determine said incremental changes.

9. A method as set forth in claim 8 further including the steps of:
measuring the horizontal travel of said one electronic pressure sensing transducer through said pipe, and
quanticizing the horizontal travel of said one electronic pressure sensing transducer.

10. Apparatus for measuring the slope of a pipeline, said apparatus comprising
a rotatable spool,
an elongated conduit adapted to be filled with liquid and having opposite ends, said conduit being wound on said spool and being removable from said spool by rotating said spool,
a first pressure sensing transducer connected to one of said ends of said conduit for measuring the fluid pressure in said one of said ends and including means for producing a first pressure indicative electrical signal,
a second pressure sensing transducer connected to the other of said ends of said conduit for measuring the pressure of fluid in said conduit at said other end and including means for producing a second pressure indicative electrical signal,
means for pulling said second pressure sensing transducer and said other of said ends of said conduit through said pipeline,
means for processing said electrical signals of said pressure sensing transducers to determine incremental changes in elevation of said pipeline as said second pressure sensing transducer is pulled through said pipeline, said processing means including a subtraction circuit and means, connected to said subtraction circuit, for quanticizing the output of said subtraction circuit and for producing a numerical readout, and
means for measuring the length of said conduit removed from said spool, and measuring means including means for measuring the angular movement of said spool during rotation of said spool.

11. The apparatus set forth in claim 10 and wherein said rotatable spool is rotatable about a horizontal axis and wherein one of said pressure sensing transducers is supported within said spool adjacent said axis.

12. The apparatus set forth in claim 10 and further including a first elongated tube, said elongated conduit being housed in said elongated tube, and a plurality of electrical wires housed in said elongated tube, said wires each being joined at one end to one of said pressure sensing transducers.

13. Apparatus for determining elevation comprising an elongated conduit adapted to be filled with liquid and having opposite ends, a first pressure sensing transducer connected to one of said ends of said conduit for measuring the fluid pressure in said one of said ends and including means for producing a first pressure indicative signal, a second pressure sensing transducer connected to the other of said ends of said conduit for measuring the pressure of fluid in said conduit at said other end and including means for producing a second pressure indicative signal, means for processing said signals of said pressure sensing transducers to produce an elevation differential readout, a rotatable spool, said conduit being wound on said spool and being removable from said spool, and means for measuring the length of said conduit removed from said spool, said measuring means including means for measuring the angular movement of said spool including a shaft position encoder, up-down counter logic means connected to said shaft position encoder, and digital display device means connected to said up-down counter logic means.

14. Apparatus for determining elevation comprising a rotatable spool,
an elongated conduit adapted to be filled with liquid and having opposite ends, said conduit being wound on said spool and being removable from said spool,
a first pressure sensing transducer connected to one of said ends of said conduit for measuring the fluid pressure in said one of said ends and including means for producing a first pressure indicative signal,
a second pressure sensing transducer connected to the other of said ends of said conduit for measuring the pressure of fluid in said conduit at said other end and including means for producing a second pressure indicative signal,
means for processing said signals of said pressure sensing transducers to produce an elevation differential readout, said processing means including a subtraction circuit and means, connected to said subtraction circuit, for quanticizing the output of said subtraction circuit and for producing a numerical readout, and means for measuring the length of said conduit removed from said spool, said measuring means including means for measuring the angular movement of said spool during rotation of said spool and including a shaft position encoder, up-down counter logic means connected to said shaft position encoder, and digital display device means connected to said up-down counter logic means.

15. Apparatus for determining elevation comprising an elongated conduit adapted to be filled with liquid and having opposite ends, a first pressure sensing transducer connected to one of said ends of said conduit for measuring the fluid pressure in said one of said ends and including means for producing a first pressure indicative signal, a second pressure sensing transducer connected to the other of said ends of said conduit for measuring the pressure of fluid in said conduit at said other end and including means for producing a second pressure indicative signal, means for processing said signals of said pressure sensing transducers to produce an elevation differential readout, a rotatable spool, said conduit being wound on said spool and being removable from said spool by rotating said spool, said rotatable spool being rotatable about a horizontal axis, and one of said pressure sensing transducers being supported within said spool adjacent said axis, means for measuring the length of said conduit removed from said spool, and a fluid reservoir supported in said rotatable spool, one end of said conduit being connected in fluid communication with said reservoir, and said one of said pressure sensing transducers being in fluid communication with said fluid reservoir.

16. Apparatus for determining elevation comprising a rotatable spool rotatable about a horizontal axis, an elongated conduit adapted to be filled with liquid and having opposite ends, said conduit being wound on said spool and being removable from said spool by rotating said spool, a first pressure sensing transducer connected to one of said ends of said conduit for measuring the fluid pressure in said one of said ends and including means for producing a first pressure indicative signal, said first pressure sensing transducer being supported in said spool adjacent said axis, a second pressure sensing transducer connected to the other of said ends of said conduit for measuring the pressure of fluid in said conduit at said other end and including means for producing a second pressure indicative signal, means for processing said signals of said pressure sensing transducers to produce an elevation differential readout, said processing means including a subtraction circuit and means, connected to said subtraction circuit, for quanticizing the output of said subtraction circuit and for producing a numerical readout, and means for measuring the length of said circuit removed from said spool, said measuring means including means for measuring the angular movement of said spool during rotation of said spool, and a fluid reservoir supported in said rotatable spool, one end of said conduit being connected in fluid communication with said reservoir, and said first pressure sensing transducer being in fluid communication with said fluid reservoir.

* * * * *

UNITED STATES PATENT AND TRADEMARK OFFICE
CERTIFICATE OF CORRECTION

PATENT NO. : 4,218,919

DATED : August 26, 1980

INVENTOR(S) : Donald K. Stephenson et al.

It is certified that error appears in the above—identified patent and that said Letters Patent is hereby corrected as shown below:

Column 8, line 14, after "and", add -- said --.

Column 10, line 27, delete "circuit" and substitute -- conduit --.

Signed and Sealed this

Twelfth Day of May 1981

[SEAL]

Attest:

RENE D. TEGTMEYER

Attesting Officer

Acting Commissioner of Patents and Trademarks